Patented Dec. 3, 1940

2,224,071

UNITED STATES PATENT OFFICE 2,224,071

CATALYTIC REACTION OF HYDROCARBONS

Albert Wassermann, London, England

No Drawing. Application May 18, 1938, Serial No. 208,695. In Great Britain May 25, 1937

5 Claims. (Cl. 260—94)

This invention relates to the catalytic polymerisation of hydrocarbons or of mixtures of hydrocarbons.

As regards catalysts, the invention is concerned with metal sulphide catalysts, and has for its object to provide improved polymerisation processes employing activated metal sulphide catalysts.

The invention consists briefly in a catalytic process for the production of hydrocarbons of relatively high molecular weight from hydrocarbons of lower molecular weight by polymerisation in which the polymerisation is effected in the presence of a heavy metal sulphide activated by association with sulphate.

PREPARATION, ACTIVATION AND APPLICATION OF METAL SULPHIDE CATALYSTS

Preparation of Catalysts

I will first describe how sulphides may be prepared among other ways for use in connection with the present invention, but I am not suggesting that these are novel methods of preparing the sulphides mentioned.

(1) Soluble salts of heavy metals, for example, Cu, Fe, Ni, Co, Tl, Bi, Pb, Mn, Hg, Mo, Cd, Zn, Sn, Ge or Sb are treated in aqueous solutions either with $H_2S$ or with another water soluble sulphide. Additions may be made of an inorganic or organic acid or base, or of organic compounds such as unsaturated aldehydes, alcohols, ketones or starch before $H_2S$ is applied. The heavy metal sulphides thus formed are either filtered off or separated from the solution as by centrifugal action.

(2) Metal filings are mixed with sulphur powder and heated in vacuo, or they are treated with gaseous $H_2S$ at reactive temperatures.

(3) Colloidal solutions of heavy metals and of sulphur are mixed.

(4) Oxides, chlorides or bromides are treated under reactive conditions with $H_2S$ gas. This method can be used for the preparation of the sulphides or V, Nb, Tl, Ta, Cr, Th, W or U.

(5) Soluble metal salts are treated in aqueous solution with carrier substances such as active carbon, carbonates, oxides, sulphates, silica gel, pumice stone, infusorial earth or like compounds until absorption equilibrium is established. $H_2S$ or other water soluble sulphides are introduced, and the heavy metal sulphide is precipitated at the surface of the carrier substance. The metal sulphide thus formed together with the carrier substance is separated from the solution as in No. 1.

(6) Metal sulphides as prepared by Methods Nos. 1–4 are mechanically mixed with a carrier substance.

(7) A carrier substance wetted with the solution of a metal salt or containing a dry metal salt or metal filings may be subjected under reactive conditions to a stream of gaseous $H_2S$.

Activation of Catalysts

The following methods can be used to activate the catalysts. Other methods, however, by which heavy metal sulphides can be converted into sulphates, or by which oxygen might become adsorbed on a metal sulphide or dissolved in a metal sulphide, might also be useful.

Method 1

Metal sulphides prepared according to any of the processes 1 to 7 above, or mixtures of such metal sulphides, with or without carrier substances, are treated with oxygen or air for instance during two months at room temperature. The treatment can be carried out at room temperature or at higher temperature, at low or high pressures, and using either wet or dry metal sulphides or mixtures.

Method 2

The metal sulphides or mixtures of sulphides prepared by any of the seven above methods are mechanically mixed with heavy metal sulphates or with mixtures of heavy metal sulphates, or with sulphuric acid using either wet or dry substances.

Examples of Application

In all the following examples, references to parts are to parts by weight, and references to temperatures are to °C. In Examples A, B, E to G, (Nos. 1–8) and H to S the reactants were enclosed in tubes and kept for some time at an elevated temperature. In these cases the volume of the tubes was about 25 times that of the reactants. At the end of the experiment the tubes were cooled, opened and the contents subjected to fractionate distillation. The technique of the measurements mentioned in Example A is described in a Ph.D. thesis by Miss B. S. Khambata presented to the University of London in March, 1938. The technique of the measurements of Examples C and D is described in the Journal of the Chemical Society, 1936, page 1,033.

EXAMPLE A

This example involves a synthetic process in which more complex molecules are formed from relatively simple molecules. The reaction is the formation of diamylene ($C_{10}H_{20}$) B. P. 160° from trimethylethylene B. P. 35°. 9 parts trimethylethylene were heated during sixty hours at 100° without catalysts or with 1 part $CuSO_4 5H_2O$ or with 1 part CuS containing 66.8% Cu and 33.1% S. No diamylene could be isolated. When the catalyst was a mechanical mixture of 0.8 part CuS (as above) and 0.2 part $CuSO_4 5H_2O$ or 0.1 part of sulphuric acid 2.7 parts diamylene were obtained.

EXAMPLE B

Catalyst (a) CuS prepared from $CuSO_4$ and $H_2S$ was kept under $N_2$ during two months, at about 20°.

Catalyst (b) CuS, same sample as above, was exposed to air during two months, at about 20°.

9 parts trimethylethylene+1 part catalyst (a) were heated during 64 hours at 100°. No diamylene could be isolated.

9 parts trimethylethylene+1 part catalyst (b) were heated as above.

2 parts of diamylene were obtained.

Under the conditions of Examples B and C both $CuSO_4$ without CuS and CuO with or without CuS were catalytically inactive.

EXAMPLE C

This example shows the catalytic efficiency of various heavy metal sulphides. The catalysts for this example have been prepared according to Examples 1 and 5 of "Preparation of Catalysts" above in the presence of atmospheric oxygen so that free sulphur and sulphate are produced, because atmospheric oxygen, in the presence of salts of heavy metals, oxidises both hydrogen sulphide and water soluble sulphides to sulphate and sulphur. The reaction dealt with in this example is a typical diene synthesis or Diels-Alder reaction, namely, the dimerisation of cyclopentadiene ($C_5H_6$) in paraffin solution. The product of the reaction is dicyclopentadiene ($C_{10}H_{12}$) 25 parts of a 1.4 molar solution and 0.6 part of catalyst were used in each run; temperature 155°.

| Catalyst | None | CuS | NiS | FeS | SnS | $Tl_2S$ | $Bi_2S_3$ | PbS | HgS |
|---|---|---|---|---|---|---|---|---|---|
| Bimolecular rate constant (l./g. mol. min.) | 2 | 6 | 5 | 6 | 5 | 4 | 5 | 5 | 6 |

EXAMPLE D

This example shows the influence of various carrier substances in accordance with the conditions of Example C. The catalysts for this example may be prepared as referred to in Example C above. Again the atmospheric oxygen produces a small amount of free sulphur and sulphate, so that the catalysts are mixtures of copper-sulphide, carrier substance, copper sulphate and sulphur. In all cases 0.6 part of catalyst were used, the other conditions being the same as in Example C.

| Catalyst | None | CuS-charcoal | CuS-$Al_2O_3$ | CuS-MgO | CuS-$CaCO_3$ |
|---|---|---|---|---|---|
| Bimolecular rate constant (l./g. mol. min.) | 2 | 4 | 2 | 2 | 5 |

0.6 part CuS-charcoal or 0.6 part CuS-$CaCO_3$ are nearly as efficient as 0.6 part CuS without carrier substance (cf. Example C) $CaCO_3$ alone was inefficient. CuS-$Al_2O_3$ and CuS-MgO were inefficient, but this might be due to the fact that the amount of adsorbed catalyst was very small.

EXAMPLE E.—Polymerisation of sym.methyl-ethyl-ethylene 9 parts of methyl-ethyl-ethylene were heated at the temperatures and during the times given below.

| No. | Temp., °C. | Time in hours | Catalyst | Amount of product in parts by weight | Boiling point of product in °C. |
|---|---|---|---|---|---|
| 1 | 100 | 240 | FeS activated by exposure to air. | 0.1 | 43–97 |
| 2 | 150 | 31 | CuS activated by exposure to air. | 4.2<br>0.1 | 35–52<br>52–110 |
| 3 | 150 | 44 | CuS activated by exposure to air. | 3.2<br>0.2 | 36–60<br>60–120 |
| 4 | 160 | 63 | CuS activated by exposure to air. | 0.3 | 70–125 |
| 5 | 100 | 65 | CuS activated by exposure to air. | 0.2 | 47–125 |

The catalyst in No. 1 was freshly prepared from $(NH_4)_2S$ and $SeSO_4$ and contained some moisture; the catalysts in Nos. 2, 3 and 4 were commercial samples, and the catalyst in No. 3 was prepared from $CuSO_4$ and $H_2S$ in said solution, and activated by exposure to air.

The catalyst in No. 3 was previously used in Experiment No. 2. It can be seen that the efficiency of the catalyst in producing the high boiling products increases after continuous use.

EXAMPLE F.—Polymerisation of butadiene 9 parts of liquid butadiene were heated at 100° C. and 150° during 65 hours with a CuS catalyst prepared from $CuSO_4$ and $H_2S$ in acid solution and activated by exposure to air. At 100° 0.1 part of a liquid of boiling point 110–120° were obtained. At 150° no liquid could be isolated but 3.1 parts of a very elastic rubber were produced. In the control without catalyst only 2 parts of much less elastic rubber were isolated.

EXAMPLE G.—Polymerisation of butylenes 9 parts of liquid butylenes were heated with the catalyst at the temperatures and during the times given below. For Nos. 1–4 normal butylene was used, and for Nos. 5–8 isobutylene prepared from tertiary butyl-alcohol and sulphuric acid.

| No. | Temp., °C. | Time in hours | Catalyst | Amount of product in parts by weight | Boiling point of product in °C. |
|---|---|---|---|---|---|
| 1 | 137 | 7 | Commercial CuS activated by exposure to air. | 0.4 | 90–140 |
| 2 | 160 | 63 | Same catalyst as No. 1. | 0.5 | 80–130 |
| 3 | 100 | 65 | CuS prepared from $CuSO$ and $H_2S$ and exposed to air during 2 months. | 2.0 | 100–200 |
| 4 | 100 | 65 | Same catalyst as No. 3. | 1.0 | 60–130 |
| 5 | 100 | 90 | Same catalyst as No. 1. | 0.3 | 90–110 |
| 6 | 150 | 65 | Same catalyst as No. 1. | 2.5<br>0.9 | 85–140<br>155–180 |

| No. | Temp., °C. | Time in hours | Catalyst | Amount of product in parts by weight | Boiling point of product in °C. |
|---|---|---|---|---|---|
| 7 | 150 | 65 | Commercial CuS of another firm activated by exposure to air. | 3.3<br>0.3 | 85–125<br>125–145 |
| 8 | 150 | 65 | CuS prepared from CuSO₄ and (NH₄)₂S and exposed to air during one month. | 2.2<br>0.7 | 85–130<br>130–175 |

The catalyst in Experiment No. 3 was previously used for another experiment involving a butylene-trimethyl-ethylene mixture, and the catalyst in No. 4 was not previously used. It can be seen that the efficiency of the catalyst increases after continuous use.

20.6 parts of a polymerised isobutylene fraction boiling between 85 and 140° C. were re-distilled and 15 parts boiling between 100 and 105° C. could be isolated. 7.0 parts of a polymerised isobutylene fraction boiling between 125 and 183 were re-distilled, and 3.9 parts boiling between 130 and 175° C. were obtained. As the boiling point of dibutylene ($C_8H_{16}$) is about 100° C., and the boiling point of tributylene ($C_{12}H_{24}$) is about 180° C., it can be concluded that the polymerised butylenes referred to are probably largely dibutylenes and tributylenes.

This conclusion is confirmed by the analysis of the carbon and hydrogen content, by molecular weight determinations and by determinations of the number of the double bonds.

40 parts of copper sulphide activated by exposure to air are introduced in a tubing which is open at both ends and heated at 180–200°. 0.8 part of gaseous butylene (of atmospheric pressure) prepared from normal butyl-alcohol pass per hour through this tubing. The products are dibutylene and tributylene in a yield of 0.4 part per hour.

EXAMPLE H.—*Polymerisation of propylene*

9 parts of propylene were heated at 150° C. during 64 hours with a CuS catalyst prepared from CuSO₄ and H₂S and activated by exposure to air. In all the following examples such a catalyst is designated "activated CuS." 0.1 part by weight of a liquid of boiling point 60–65° was obtained.

EXAMPLE I.—*Polymerisation of ethylene*

9 parts of ethylene were heated at 200° during 100 hours with "activated CuS." 0.1 part by weight of a liquid of boiling point 50–150° was obtained.

EXAMPLE J.—*Polymerisation of a mixture of methyl-ethyl-ethylene and trimethyl-ethylene*

13.5 parts of methyl-ethyl-ethylene and 4.5 parts by weight of trimethyl-ethylene were heated during 65 hours with "activated CuS" at the temperatures given below.

| Temp., °C. | Amount of product in parts by weight | Boiling point of product, °C. |
|---|---|---|
| 160 | 8.6<br>1.4 | 36– 50<br>110–150 |
| 150 | 0.7 | 120–140 |

EXAMPLE K.—*Polymerisation of a mixture of methyl-ethyl-ethylene and isobutylene*

13.5 parts by weight of methyl-ethyl-ethylene and 4.5 parts by weight of isobutylene were heated with "activated CuS" during 64 hours at 150° C. The product contained 7.5 parts of boiling point 30–55°, 2.4 parts of boiling point 95–130° and 0.3 part of boiling point 130–145°.

EXAMPLE L.—*Polymerisation of a mixture of butylene and isobutylene*

13.5 parts of butylene and 4.5 parts of isobutylene were heated with "activated CuS" at 150° C. during 64 hours. The product contained 3.5 parts of boiling point 75–110° and 1.6 parts of boiling point 110–210°.

EXAMPLE M.—*Polymerisation of a mixture of isobutylene and butadiene*

13.5 parts of isobutylene and 4.5 parts of butadiene were heated with "activated CuS" at 100° during 65 hours. The product contained 0.2 part of boiling point 70–90° and much rubber.

EXAMPLE N.—*Polymerisation of a mixture of propylene and isobutylene*

13.5 parts of propylene and 4.5 parts by weight of isobutylene were heated with "activated CuS" at 150° C. during 65 hours. The product contained 0.9 part of boiling point 64–93° C. and 0.6 part of boiling point 100–120° C.

EXAMPLE O.—*Polymerisation of a mixture of propylene and trimethylethylene*

13.5 parts of propylene and 4.5 parts of trimethyl-ethylene were heated with "activated CuS" at 150° C. during 64 hours. The product contained 1.3 parts of boiling point 42–65° C. and 0.3 part by weight of boiling point 70–120° C.

EXAMPLE P.—*Polymerisation of a mixture of trimethyl-ethylene and pentane*

13.5 parts of pentane and 4.5 parts by weight trimethylethylene were heated with "activated CuS" during 65 hours. At 100° C. or at 150° C. the product contained 1.6 parts of boiling point 140° C.

EXAMPLE Q.—*Polymerisation of a mixture of butylene and trimethylethylene*

Various quantities of normal butylenes and trimethylethylene were heated with "activated CuS" at 100° C. during 65 hours. The results of four such variants are shown below.

| No. | Amount of butylene in parts by weight | Amount of trimethyl-ethylene in parts by weight | Amount of product in parts by weight | Boiling point of product in °C. |
|---|---|---|---|---|
| 1 | 9 | 9 | 4.2<br>3.0 | 48–210<br>50–150 |
| 2 | 13.5 | 4.5 | 0.6<br>1.4 | 150–210<br>45– 63 |
| 3 | 4.5 | 13.5 | 2.3<br>1.0 | 110–190<br>60–130 |
| 4 | 0 | 4.5 | | |

No. 4 was carried out as Nos. 1–3, but after the heating was finished 13.5 parts of liquid butylene were added, and then the distillation of the product was carried out.

EXAMPLE R.—*Polymerisation of a mixture of isobutylene and pentane*

13.5 parts of pentane and 4.5 parts of isobutylene were heated with "activated CuS" during 66 hours at 150° C. The product contained 0.6 part of boiling point 100–110° C. and 0.5 part by weight of boiling point 110–155° C.

EXAMPLE S.—*Polymerization of acetylene*

40 parts of "activated" copper sulphide are introduced in a tubing which is open on both ends and heated at 180°–200°. 0.4 part of dry gaseous acetylene of atmospheric pressure pass per hour through this tubing over the catalyst. The product is cuprene which is formed in a yield of 0.39 part per hour.

*General*

Metal sulfide-sulfate catalysts or metal sulfide-sulfate catalysts which contain molecular oxygen in an absorbed or dissolved state or metal sulfide-metal sulfate-sulphur catalysts which contain molecular oxygen can be used not only for reactions of the type discussed above, but also for other polymerisation reactions involving hydrocarbon. The reaction dealt with in Examples C and D is a typical Diels-Alder reaction, and the catalyst described can also be used for all types of other Diels-Alder reaction or inverse Diels-Alder reactions.

All the reactions can occur either in the condensed or in the gaseous state, either at high or at low pressure, either at high or at low temperatures. In many cases it might be useful to employ mixtures of catalysts mentioned above with or without carrier substances.

The sulphate used need not be the sulphate of the same metal as that which forms the sulphide. The sulphides are preferably used in powder form. In general the amount of sulphate should not be less than about 5 per cent. of the sulphide, and not greater than about 50 per cent.

The activity of the catalysts improves in some cases after continuous use, and in other cases the activity is at least not seriously reduced.

Although some examples, such as for instance Example D, are contained in a section of the specification dealing partly with what may be regarded as comparative tests, they do in fact form part of the invention.

The catalysts described above are especially suitable for the conversion of olefinic or acetylenic gases either into hydrocarbons of moderately high molecular weight, boiling in the range of commercial fuels, or into hydrocarbons of high molecular weight, for example, rubber or resins. These components can either be prepared from pure hydrocarbons or from hydrocarbons dissolved in indifferent solvents or mixtures of solvents or from mixtures of hydrocarbons of relatively low molecular weight.

The butylenes referred to above can be prepared from butyl-alcohol according to known methods (cf. for instance the procedure of the British Patent No. 165,452 or of the American Patent No. 2,067,473). Water or some other compound, such for example as acetone, does not substantially or at all decrease the catalytic activity of the catalysts here described, and hence the conversion of butyl-alcohol or of butyl-alcohol-acetone mixtures into butylene polymers can be carried out in one step and in one apparatus by using a mixture of aluminium oxide or other metal oxides with activated heavy metal sulphides with or without carrier substances.

The metal sulphide used in any of the above examples may be replaced by other heavy metal sulphides or mixtures of such sulphides.

All the catalysts mentioned above may also be used in connection with mixtures consisting of more than two compounds.

I claim:

1. A process for the treatment of olefin hydrocarbons with a combined catalyst consisting of a heavy metal sulphide and a heavy metal sulphate, which said treatment comprises subjecting the olefins together with the aforesaid combined catalyst to a temperature less than about 200° C. and more than about 100° C., until a part of the olefins is converted into polymers the boiling point of which is at atmospheric pressure at least 50° C. higher than that of the starting material.

2. A process for the treatment of olefin hydrocarbons with a combined catalyst consisting of a heavy metal sulphide and a heavy metal sulphate, which said treatment comprises subjecting the olefins together with the aforesaid combined catalyst to a temperature less than about 200° C. and more than about 100° C., until a part of the olefins is converted into polymers which are liquid at room temperature and the boiling point of which is at atmospheric pressure at least 50° C. higher than that of the starting material.

3. A process for the treatment of olefin hydrocarbons with a combined catalyst consisting of a heavy metal sulphide and a heavy metal sulphate, which said treatment comprises subjecting the olefins together with the aforesaid combined catalyst to a temperature less than about 200° C. and more than about 100° C., until a part of the olefins is converted into polymers which are solid at room temperature.

4. A process for the treatment of olefin hydrocarbons in admixture with a paraffin hydrocarbon with a combined catalyst consisting of a heavy metal sulphide and a heavy metal sulphate, which said treatment comprises subjecting the mixture together with the aforesaid combined catalyst to a temperature less than about 200° C. and more than about 100° C., until a part of the starting material is converted into polymers which are liquid at room temperature and the boiling point of which is at atmospheric pressure at least 50° C. higher than that of the starting material.

5. A process for the treatment of olefin hydrocarbons in admixture with a paraffin hydrocarbon with a combined catalyst consisting of a heavy metal sulphide and a heavy metal sulphate, which said treatment comprises subjecting the mixture together with the aforesaid combined catalyst to a temperature less than about 200° C. and more than about 100° C., until a part of the starting material is converted into polymers which are solid at room temperature.

ALBERT WASSERMANN.